Feb. 28, 1939.　　　　　W. J. MILLER　　　　　2,148,871
PROCESS AND INSTALLATION FOR MAKING POTTERY
Original Filed Nov. 4, 1931　　4 Sheets-Sheet 1

Inventor
William J. Miller
George J. Croninger
Attorney

Feb. 28, 1939. W. J. MILLER 2,148,871
PROCESS AND INSTALLATION FOR MAKING POTTERY
Original Filed Nov. 4, 1931 4 Sheets-Sheet 2
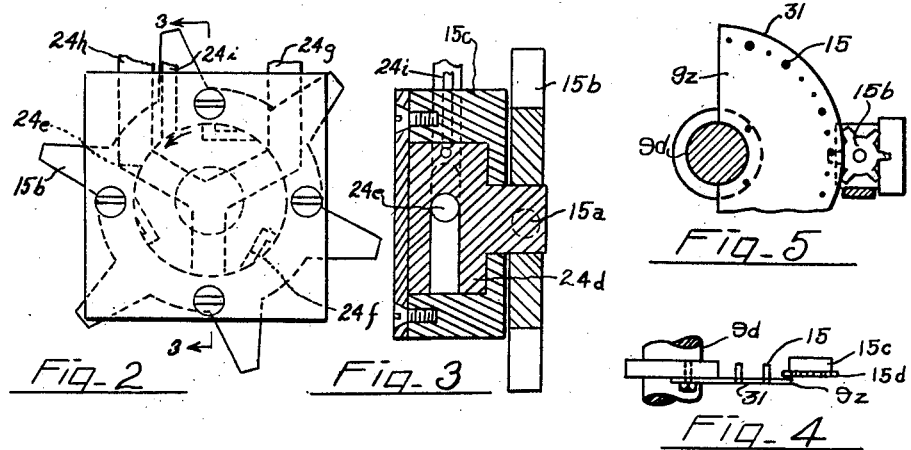
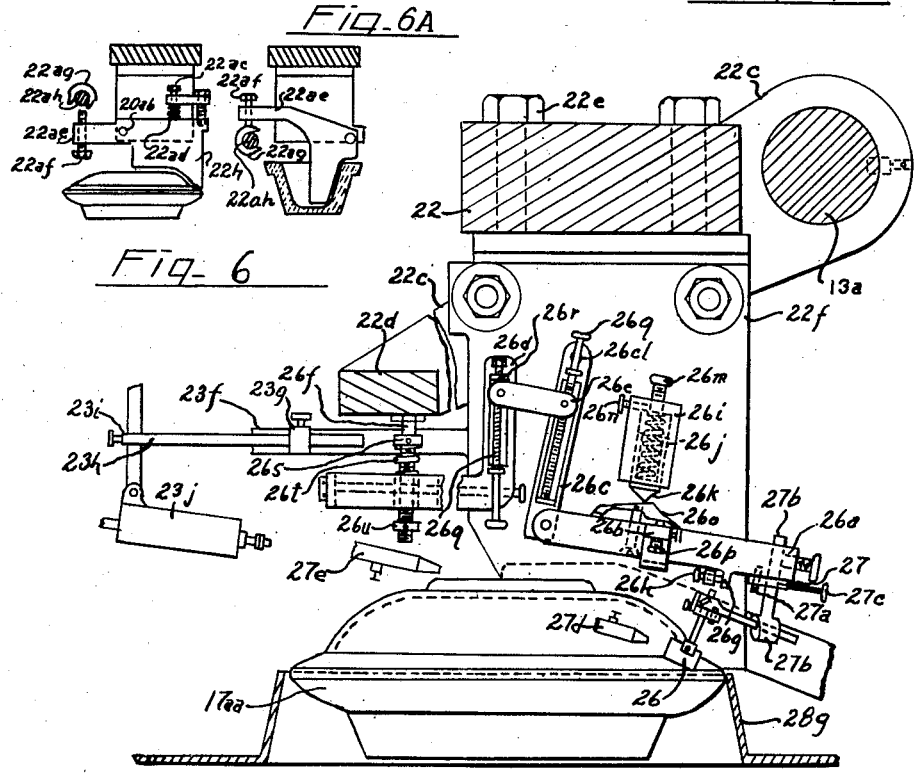
Inventor
William J. Miller
George J. Groninger
Attorney

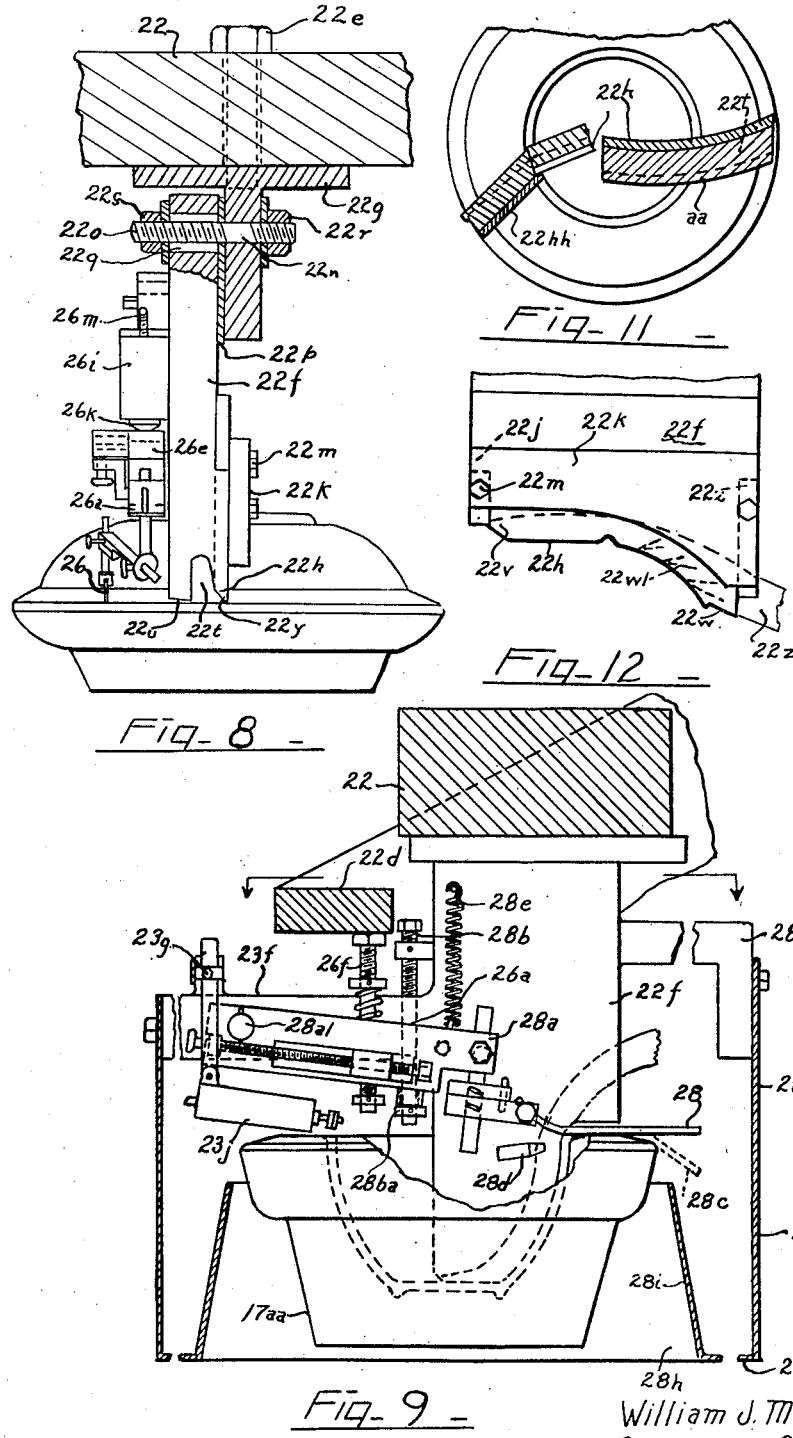

Feb. 28, 1939.  W. J. MILLER  2,148,871

PROCESS AND INSTALLATION FOR MAKING POTTERY

Original Filed Nov. 4, 1931  4 Sheets-Sheet 4

Inventor
William J. Miller
George J. Croninger
Attorney

Patented Feb. 28, 1939

2,148,871

UNITED STATES PATENT OFFICE 2,148,871

PROCESS AND INSTALLATION FOR MAKING POTTERY

William J. Miller, Swissvale, Pa.

Original application November 4, 1931, Serial No. 573,017. Divided and this application July 5, 1935, Serial No. 29,886

14 Claims. (Cl. 25—22)

This invention relates to improvements in processes, installations, mechanisms and apparatus for the manufacture of potteryware. This application is a division of my co-pending application for United States Letters Patent, Serial Number 573,017, and relates specifically to the jiggering of potteryware of the class known as dinnerware, viz: cups, plates, saucers, etc. and that phase concerning the removal of excess clay as in the profiling and trimming operations after it has been applied to a mold and additionally has to do with the application of fluid in the removal of excess clay and the disposal of this excess clay.

The objects of this invention are to produce high grade jiggered potteryware, to provide quick location in accurate position of the ware forming profile and trimmer tools and fluid applying means; to provide for quick adjustment and interchange of profiling and other forming tools and accessories; to provide a common source of fluid supply in the various steps of manufacture while permitting adjustment of application in the individual step; to effect immediate removal of trimmings of clay to preferred points of deposit during ware forming operations; and, to automatically remove excess clay from the surface of the clay ware undergoing fabrication, convey the same away from the ware surface and profile tool to beyond the brim of the mold.

In the drawings:

Fig. 2 is a plan view of a water valve;

Fig. 3 is a sectional view of Fig. 2 on line 3—3;

Fig. 4 is a side elevation of mechanism which operates the water valve;

Fig. 5 is a plan view of Fig. 4;

Fig. 6 discloses a mounting for a flat ware profile and Fig. 6A a similar type of mounting for a hollowware profile.

Figure 10:
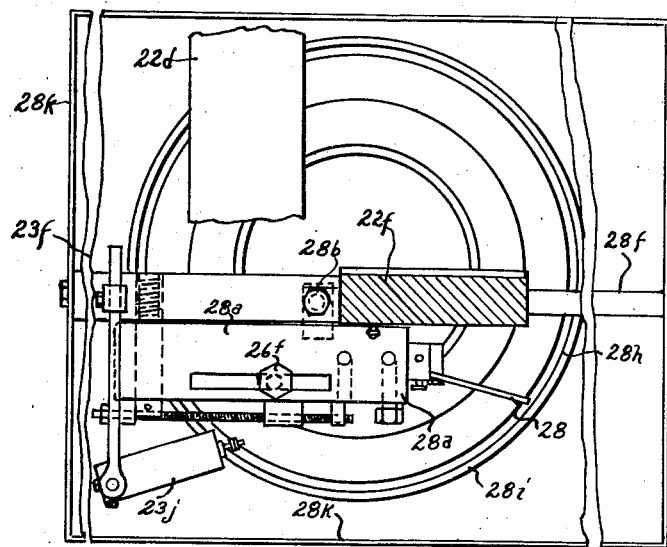
Figure 14:
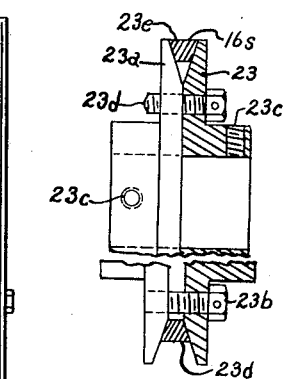
Figures 13, 15:
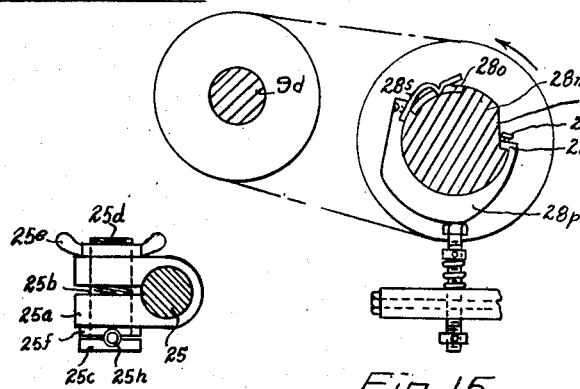
Figure 16:
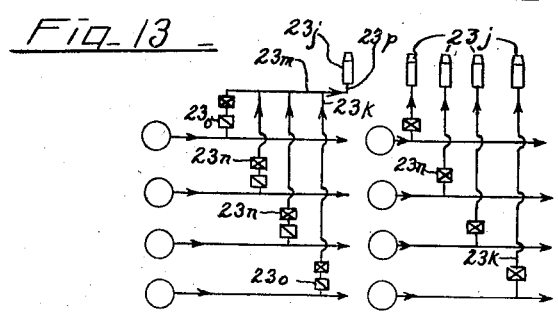
Figure 17:
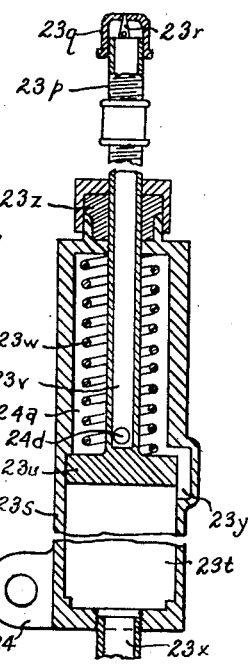

Fig. 7 is a side elevation of a profiling and trimming unit for shallow ware;

Fig. 8 is an end view of Fig. 7 from right to left;

Fig. 9 is a side elevation of a profiling and trimming unit for deep ware;

Fig. 10 is a plan view of Fig. 9;

Fig. 11 is a plan view of a curved and angular profile tool;

Fig. 12 is an elevation of a profile tool;

Fig. 13 shows a universal clamp employed for mounting some of the forming tools and appliances;

Fig. 14 shows an adjustable sheave used in driving the jigger spindle;

Fig. 15 shows a removable cam;

Fig. 16 is a diagrammatic view of the water system;

Fig. 17 shows the construction of the water nozzles.

Figure 1:
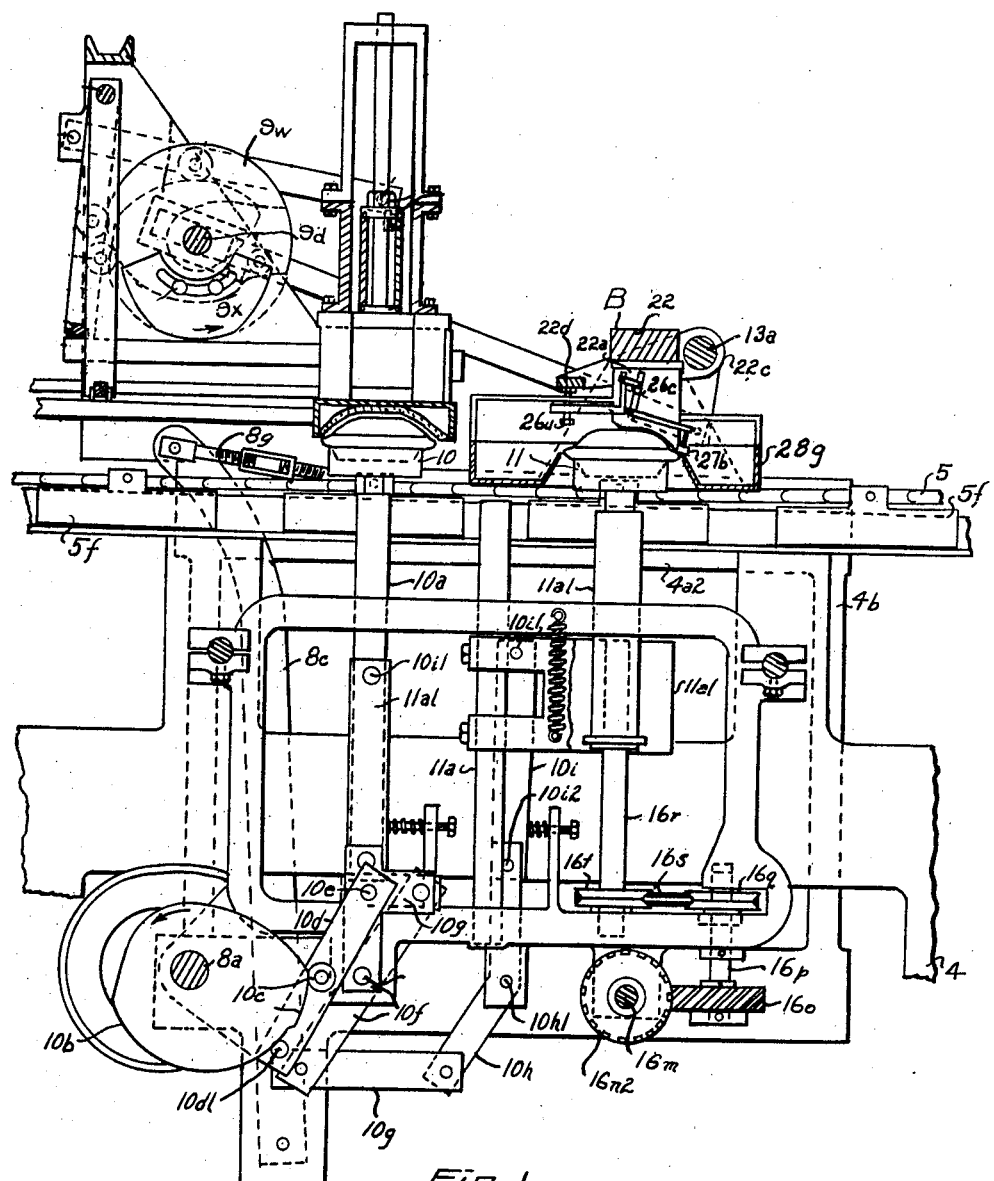
Fig. 1 is a sectional view in elevation of a jiggering apparatus.

In general outline, as in my co-pending application supra, a fabricating machine comprises a feeding station A, Fig. 1, a profiling station B and a conveyor 5 for transporting a series of mold trays 5f, suspended by trunnions from links of the conveyor chains 5e, through these stations; a drier through which the formed ware is passed either by the same or a different conveyor; and, if desired, further fabricating stations arranged behind the drier in the direction of ware travel, or at an intermediate stage of the drier, or both. Each mold tray has a plurality of mold seats for the reception of the same or different form molds, said trays being successively traveled to and through the fabricating stations, the fabricating devices being preferably arranged in multiple laterally of the conveyor. The machine is adapted to fabricate simultaneously on a corresponding number of the same or different lines of ware or, the apparatus and conveyor may be set up for single line production only.

The profiling or forming station B, according to the present invention, has an assembly of appliances including profile blade, trimmer, air and water nozzles, which can be interchanged as a unit while permitting independent adjustment of all the appliances.

After the mold is charged and deposited on the tray, it is advanced to the profiling station and a chuck elevates it to final forming operating position through a toggle 10g and cam 10b mechanism. It is preferred to elevate the mold rather rapidly until the blank contacts with the profile tool, or within from .030 inch to .050 inch of maximum elevation, then slowly to maximum elevation, to avoid ripping of the clay surface by the profile tool. This followed by a dwell period followed by a very slow drop of about .005 inch to provide for progressively reducing the pressure of the profile tool on the ware surface during the terminating polishing operation and also avoid the usual tool mark on the ware surface when ware and tool are parted abruptly, then rather rapidly until the mold nears the mold ring, then slowly while depositing the mold on the ring, then the chuck is dropped rapidly. This method of procedure produces ware free from tool marks and is particularly applicable when the batt is mechanically applied and of dependable unvarying thickness and contour.

Referring to Fig. 1, a frame girder 22 supported by bracket 22a is provided with a suitable bearing to support a rocker shaft 13a to which are secured arms 22c connected together by a cross bar 22d. To girder 22 are secured the profiling implements (see Figs. 7, 8, 9, and 10) by means of dowels and bolts 22e. To reduce the time necessary in the replacement of these profiling implements and provide for adjustment while in operation, thus providing for the maximum of continuous operation, I have assembled into one unit and arranged to be assembled and adjusted on a dummy set up apparatus, mechanisms ordinarily individually attached to the machine. Thus, I have assembled into one unit the profile tool, the trimmer and operating mechanism, the water and air application nozzles and a spill plate or splash guard so that when changing from one type of ware to another, the time necessary is materially reduced, and when applied, immediate production obtained without tedious interruptions due to adjustments.

The mold conveyor and the fabricating units of the machine are mounted in a frame with brackets 4b extending upwardly from the base members 4. Two chains 5 carrying the trays 5f are in sliding engagement with the tracks 4d, and extend through the drier and fabricating stations outside the forming machine. A synchronizing chain is provided to keep the main sprockets of the chains 5 in step and maintain a predetermined amount of slack therebetween notwithstanding any excess slack in the other portion of the conveyor chains. The trays 5f (Fig. 2) are hung above their center of gravity for maintenance in a horizontal position regardless of direction of travel of chain 5.

The chains 5 and trays are shifted by levers 8c having at their upper ends adjustable pawls 8g making intermittent contact with the tray trunnions on the right hand stroke of the levers only and trailing idly as the levers move to the left, thus providing for shifting some of the trays intermittently to the right in the course of the general advance of the chain and trays over sprockets. As the trays are shifted to the right, slack accumulates to the right of the shifted tray and is dissipated or absorbed to the left of the tray due to the synchronous travel of main sprockets.

The cross shaft 8a, Fig. 1 is included in the drive for the fabricating units of the machine, and through a sprocket secured thereto and associated chain transmits motion to an upper shaft 9d to which are secured cams 9x and 9w for operating the feeder, not herein specifically described. The lower shaft 8a has secured thereto various cams for actuating the chuck devices through toggles 10g which elevate the chucks 10 and 11 secured to shaft 10a and 11a1. These toggle mechanisms exert a progressively increased terminal elevating force on the chucks, and a smoother, slower, and more accurate terminal movement. Cam 10b on shaft 8a oscillates a lever 10d pivoted at its lower end on a fulcrum 10d1 and carrying a roller 10c engaging the cam. The upper end of this lever 10d is jointed by a link 10e to a toggle lever 10f connected by suitable joints 10g, to one of the toggle levers 10h, pivoted medially on a fulcrum 10h1. The other toggle member 10i is joined at its upper end 10i1 to the chuck stem 10a or spindle 11a and at its lower end 10i2 to the toggle lever 10h, this joint constituting the knee of the toggle. The parts are so arranged that in the upper or raised position the toggle members 10h, 10i and the chuck stem are in alignment providing rigid vertical support for the chuck, while in lowered position the toggle parts are collapsed. Accordingly, as the trays are halted at the profiling station, the chucks 11 engage and elevate the molds, and return the molds to the trays at the termination of the profiling operation.

For rotating the work incident to profiling the shaft 16m has secured to it, a gear 16n2 (Fig. 1) meshing with a gear 16o secured to a shaft 16p to which is secured an adjustable sheave 16q which transmits motion to a chuck spindle 16r through the medium of a V-belt 16s and adjustable sheave 16t. The spindle 16r is in splined-sliding engagement with the chuck spindle 11a and chuck 11 of the profiling station. As the pitman 16a is reciprocated, the chuck spindle 11a1 with the chuck 11 is caused to intermittently rotate and rest and the cams 16 are adjusted to synchronize the periods of rotation with that of the elevation of the chucks by the cam 10b and also, in synchronism with the tray shift and other operations for a purpose hereinafter more fully described.

The preferred form of profile for flat ware is as shown in Figs. 7, 8, 12, in which a frame 22f is integral with or fixed on a head 22g. The frame 22f was heretofore made of wood, but I prefer to make it of a light metal which does not stain clay such as aluminum. In Fig. 12, is shown the preferred method of securing a profile blade 22h onto the frame 22f providing for quick replacement of blades when they become dull from use. The frame 22f is provided with two rectangular bosses 22i, and the blade 22h with two projecting ears 22j; a clamp 22k secured by screws 22m retains the blade 22h in position against upward displacement, the ears 22j resting on the bosses 22i limiting the lowermost position of the blade, and the blade edges fitting snugly between the bosses 22i determine lateral positioning. As the cutting edge of the blade 22h wears away and is redressed, the ears, where they contact with the bosses 22i, are dressed back to an equal extent and checked for accuracy in the dummy set up, so that when replacing the blade, it is necessary only to drop it onto the bosses 22i and tighten screws 22m, in order to insure correct position without tedious trials and adjustments. In case it is desired to adjust the lower portion only of the profile frame and also provide for quick replacement in correct position, the structure shown in Fig. 8 is preferred. The head 22g is provided with two dowel holes 22n into which project two studs 22o threaded into a plate 22p. The profile frame 22f is provided with two enlarged openings 22q and the stud 22o is provided at both ends with nuts and washers. By removing nut and washer 22r, the profile frame may be removed from the head 22g and replaced in correct position. By loosening nut and washer 22s, the frame 22f may be adjusted. As the quality of the ware is dependent upon the sharpness of the profile cutting edge and the abrasive nature of the clay necessitates frequent replacement, the advantage of this quick change arrangement is apparent.

It is desirable to establish and maintain an optimum speed of mold rotation for each kind or line of ware, while selectively limiting or terminating the profiling operation or predetermining the number of rotations during which the ware in each line is in contact with the profile in order to avoid excessive or deficient tooling of the surface, by withdrawing the tool from the ware surface, when said surface is in the best condition, irrespective of the operative conditions of the other molds and ware thereon.

To achieve these results the profile holder is mounted on a pivot 20ab, Fig. 6, which is positioned so that when tilted, the blade 22h will progressively recede from the ware surface at all points. A screw 22ac adjustably limits the approach of the blade to the mold surface and a spring 22ad adjustably mounted determines the application pressure. The holder is provided with an arm 22ae having in its end an adjustment screw 22af which contacts with a cam 22ag mounted on a shaft 22ah as shown in Fig. 6.

According to usual present practice, it is necessary to manually remove the excess clay from the face of the profile after each piece of ware is made. Obviously, in an automatic machine, this is impractical and I have therefor devised a means for automatically disposing of this excess clay. In Figs. 8 and 12 my improved type of profile is provided in the lower edge of the frame adjacent the blade with a groove 22t and a ledge 22u extends to nearly the same depth as the cutting edge of the blade 22h. The groove 22t is of smaller cross section at the center forming portion 22v and of gradual enlarged cross section as it approaches the rim forming portion 22w which extends over the edge of the mold. As the blade 22h scrapes off the excess clay from the batt, the taper portion 22y of the blade 22h forces the clay into the top of the grooves 22t and the ledge 22u confines it so that gradually a pressure is built up in the groove at 22v and the open end 22w, is less at 22w than at 22v, and the clay will move to the point of least resistance and emerge from the opening 22z in the form of a column clearing the edge of the mold and being projected some distance away from the edge of the mold and profile frame. This action is assisted by the lubricating action of the water mixing with the clay which is scraped off by the profile, the application of this water being explained later.

When making large ware, it may be desirable to assist the extruding forces above outlined by providing a curved profile, (Fig. 11), at aa so that the rotating face of the batt contacts tangentially with the blade and the clay in the groove 22t and thereby assists in pushing the clay towards the periphery of the mold, as shown. Substantially the same effect may also be realized by providing one profile 22h placed radially for the central portion of the ware, as shown in Fig. 11 and one profile 22hh placed tangentially for the outer portion of the ware.

When making cups etc. in cavity molds, the profile tool may also be inclined from the true vertical or twisted like an auger to produce the same results. In addition or as a substitute, ratchet teeth 22wl inclined towards the outlet 22w may be provided in the heel of an inclined surface of the cutting edge 22h which serve to direct and propel the clay initially towards the outlet 22w.

The speed of rotation of different sized ware must be kept within certain limits, and in Fig. 14, I show means for adjusting the speed of the chuck. Fig. 14 is a detail of the pulleys shown in Fig. 1 and designated at 16t and 16q, a belt 16s of the V-type transmitting power between the two. The sheaves are in two halves 23 and 23a, held in adjusted position by screws 23b and secured to the shaft by screw 23c. By separating one sheave as shown at 23d and closing the other as shown by 23e, the same length of belt will serve, while the speed is altered. Any other means may be employed for obtaining this speed variation.

During the profiling operation, it is necessary to apply a lubricant such as water to the surface of the ware to prevent undue drag of the profile blade on the clay and assist in polishing the surface of the ware at the termination of the profiling operation. The application of this water has a considerable bearing on the quality of the ware produced. The quantity of water applied, the time of application, the duration of application, the location and angle of impact and the number of applications are the more important.

A bracket 23f (Figs. 7, 9, 10) extends from the profile frame 22f and is provided with a universal connection 23g detailed in Fig. 13. A bar 23h extends from this universal connection and is provided at its outer end 23i with another universal connection to which is secured the nozzle 23j thus providing for vertical, horizontal and angular positioning of the nozzle member 23j. A plurality of nozzles and securing means may be provided so that succeeding jets of water may be applied to the surface of the batt at various points and times.

The valves for controlling the application of water to the nozzles are shown in detail in Figs. 2 and 3 and the method of operating these valves in Figs. 4 and 5. Fig. 16 illustrates, diagrammatically, the plan of employing a multiple of valves all connected to one nozzle and the valves timed so that they function in sequence. Lateral pipes 23k connect with nozzle manifold 23m at one end and with the valve manifold at the other. Each is provided with an adjustable control valve 23n and a check valve 23o and each profile is provided with a similar structure. A nozzle 23j is connected to the end 23p of the nozzle manifold. By closing one or more of the valves 23n, that portion of the stream controlled by that particular valve is eliminated, so that either an interrupted stream or a stream of less duration depending on which valves are closed, is applied. The check valve 23o prevents back flow of water to thus insure accurate functioning of all the nozzle units. At times, it is desirable to apply succeeding jets of water at different points on the surface of the batt and in that case, the valve manifolds and checks 23o are eliminated, the nozzles being connected directly to their respective lateral pipes 23k. Any one or more of the nozzles may be rendered inoperative by closing valve 23n. The nozzles proper may be constructed as shown in Fig. 17, the pipe 23p having on its end an orificed cap 23q adjustable with respect to a fixed needle valve 23r in order to vary the cross sectional area of the stream. By properly proportioning the needle contour with the orifice contour, any desired shape of stream from a solid stream to an open spray may be obtained, the former serving for definite point application, the latter for promiscuous application. Under certain conditions, it may be desirable to retract the nozzle away from the working surface of the ware after it has applied its charge of water and in Fig. 17, I have detailed a structure adaptable to this purpose. A casing 23s is provided with an enlarged bore 23t in which works a piston 23u secured to a hollow piston rod 23v, a spring 23w being located between the piston and smaller part of the casing. The latter has an inlet 23x and a by-pass port 23y. A gland 23z prevents leakage around the piston rod. A lug 24 facilitates securing the nozzle to the profile frame 22f through universal connections previously described. The spring 23w serves to keep the piston normally in a position adjacent the inlet 23x and when water is admitted through valves (Figs. 2 and 3) and inlet 23x, the piston rod and nozzle are forced forward uncovering port 23y and permitting water to pass into the smaller bore chamber 24a and through a port 24b into the hollow piston rod and thence to nozzle 23q. When the water pressure in the inlet 23x is shut off and that port connected to atmosphere, the spring 23w forces the piston backwards and simultaneously acts to suck back any water that may still remain in the hollow rod 23v, so that this valve structure functions to first project the nozzle to the desired position, then apply a jet of water to the ware surface, and then retract the nozzle away from the ware preventing dripping of water onto the same when the nozzle is inactive and prevent damage to the nozzle or ware during its inactive period.

In Figs. 2 and 3, the valve casing 15c is provided with a valve body 24d secured by its stem 15a to a star wheel 15b and provided with three ports 24e and three vents 24f intermittently communicating with ports 24g and 24h and leakage port 24i in the casing so that when the valve is in position shown in Fig. 2, water from the supply line enters at 24g and issues at 24h and thence to the various nozzles. At the next ⅙ rotation of the valve, port 24f communicates with 24h and 24i to thereby connect the nozzle to the atmosphere or vacuum.

Figs. 4 and 5 show the means for actuating the water valves, shown attached to shaft 9d, and adjusting the instant of actuation of the control cam. A cam disc 9z on the shaft 9d is provided with a series of threaded openings 31 into which a number of studs 15 are secured. These studs engage the arms of a star wheel 15b and shift it one notch or ⅙ revolution and as the valve requires a ⅓ revolution from one open to another open position, it follows that at every alternate functioning, the valve is opened and closed. These studs may be placed at various positions and serve for adjusting the relative instant of and number of functions of the fluid control valve during one cycle. The disc 9z is also adjustable on its shaft.

After the plate is profiled, to finished shape, it is necessary to trim the clay from the brim and exposed portions of the mold which during the profiling operation has become coated with clay. For this purpose, I have provided the structure shown in Figs. 7, 8, 9 and 10.

The trimmer blade 26 (Fig. 7) is secured to an operating pitman 26a through the medium of the universal clamp (Fig. 13) and is retained in lateral position by a bracket 26b. The pitman 26a is pivoted at its far end to a lever 26c, pivoted at 26c1 and which in turn is connected to a bell crank 26d by the link 26e, the bell crank 26d being provided in its horizontal portion with a stud 26f which contacts with the bar 22d. A lug 26g projects from the pitman 26a and contacts with a screw 26h threaded into a projection of the frame 22f to thereby adjustably limit the advance of the trimmer blade 26 towards the edge of the ware. A housing 26i projects from the frame 22f and is bored to house a spring 26j and a plunger 26k. The spring tension is adjustable through a screw 26m and detent 26n and the plunger resiliently contacts with a cam 26o secured to the pitman 26a, its upper surface being contoured to suit. The lever 26c and the vertical portion of the bell crank 26d are provided with screw studs 26q carrying movable pivot blocks 26r to which is pivoted the link 26e and whereby the vertical position of the link may be adjusted and thereby adjust the horizontal travel of the pitman 26a while in operation. The screw 26f is provided with an adjustable collar 26s, a spring 26t and an adjustable collar 26u. The collar 26s adjusts the tension of the spring 26t and the collar 26u determines the vertical position of the head of the screw 26f. By adjusting the collar 26u upwards, a gap is provided between bar 22d and screw head 26f across which the bar 22d must travel before contacting with the screw and consequently delays the advance of the trimmer 26 and also reduces its extent of travel forward. Then by adjusting the link 26e downward, the extent of travel may be restored and its speed of travel is increased. By adjusting the link downward as before, and maintaining the collar 26u in its present position, the trimmer is caused to function earlier, the spring 26t compressing on final depression of bar 22d due to the screw 26h limiting the advance of pitman 26a and this also increases the dwell of the trimmer 26 in advanced position. This provides for operating a multiple of trimmers off a reciprocating bar having uniform travel throughout and enabling the operator to obtain variations in speed of trimmer, dwell in advanced position, instant of advance and maximum pressure applied to advance the trimmer. Through the medium of the housing 26i and cam 26o, pressure of the trimmer 26 against the mold surface may be adjusted and the contour of the cam 26o provides for varying the pressure of the trimmer blade on the mold at any point during its travel. To provide against derangement of the trimmer 26 from nicked or defective mold brims and to properly start the trimmer over the edge of the brim of the mold, I provide the cam 26o with a lower or under side contoured surface which may be to a different contour than the upper portion and which bears against a screw 26p and limits the lowermost position of the blade 26. To provide for quick replacement of trimmers 26, a dog 27 having a dowel 27a secured in one end is clamped to a stem 27b by a screw 27c, thus providing for the removing of the stem 27b and trimmer 26 as a unit and replacing it with another unit which has previously been set correctly on a dummy or duplicate unit away from the machine, or replacing the same unit in exact position it occupied before removal, thereby greatly reducing the time otherwise necessary for replacing a trimmer and adjusting it carefully. The universal mounting of the trimmer 26 facilitates the setting of the blade 26 to any desired angle both vertically and horizontally and also its position horizontally on the mold and also its degree of tangential travel on the mold. To insure against adhesion of the clay on the trimmer 26, I prefer to advance the trimmer rather rapidly to thereby increase the size and weight of the trimmings which renders them less liable to adhere to the blade due to momentum they possess. To still further insure against adhesion and to direct the trimmings to a predetermined point of deposit lest such trimmings fly or be deflected onto the surface of the freshly formed ware or accumulate on the gear and drop back onto the ware surface, I provide a nozzle member 27d, controlled by valves such as shown in Figs. 2 and 3, adjacent the profile and adjustably secured in position by the universal clamp heretofore described. During the trimming operation, this nozzle 27d directs a jet of air against the trimmings to propel them to a definite point of deposit and prevent adhesion to the blade 26. An air nozzle 27e, similarly controlled and mounted, is directed against the ware to remove or uniformly distribute excess water or slurry over the surface of the ware.

When making cups, etc., the structure as shown in Figs. 9 and 10 is employed. In this case, the profile is also provided with a waste material extruding groove and is mounted substantially similarly to that shown in Figs. 7 and 8. The trimming operation however is somewhat different. The top surface of the mold is preferably convex shape and a wire 28 is secured by a universal joint to an operating lever 28a. A screw 26f mounted and functioning similar to that shown in Fig. 7 transmits motion from the bar 22d to the lever 28a, which is pivotally secured at 28a1 to the profile frame 22f through an extension 23f. A screw 28b provided with collar 28ba, limits the lowermost travel of lever 28a. The wire trimmer 28 is flexible and is mounted so that at first contact with the mold, it is in the position shown at 28c and when depressed to maximum position it is as at 28, intermediate of these two positions, it follows the contour of the mold top having point contact only so that on initial contact, it cleans the outer edge of the mold and progressively follows to the bore, then when being elevated this is repeated in reverse. In this type of trimmer, it is of greater importance to depress the trimmer rapidly to thereby remove large portions of excess clay at one time so as to prevent adhesion of the clay to the wire 28 and also prevent throwing of fine chips or shavings of clay into the mold interior. The screw structure 26f heretofore more fully explained serves to control the speed of trimmer application on cups independent of that employed in making plates. An air jet 28d, mounted on a universal joint, aids and insures dislodgment of trimmings and directs their deposition. The trimmer is elevated by means of spring 28e. The profile frame 22f is provided with brackets 23f and 28f to which is secured waste material spill pan or guard 28g provided with a bore 28h and an upwardly extending cone 28i whose upper bore is slightly larger than the mold and this cone is for the purpose of preventing waste material from falling down into the mechanism beneath the mold and enabling the accumulation of a large quantity of waste material in the pan to thus provide for less frequent removal. The pan is provided with a floor 28j and an outer wall 28k, the outer wall acting as a splash guard to prevent the throwing of waste material onto adjacent molds and confines it within a definite area.

Fig. 13 shows a universal adjustment clamp. A securing stem 25 is a snug fit in the bore of the split clamp 25a which is bored at right angles for insertion of a stud 25b having a head 25c at one end and a threaded portion 25d at the other in engagement with nut 25e. A washer 25f loosely encircles the stud 25b which has a bore through which a tube 25h or rod may be projected. When the nut 25e is loosened it simultaneously loosens rod 25h and 25 so that the rod or tube 25h may be swung around in any position besides being slidden along the bar 25 to change the location. This type of clamp provides for quick adjustment of the spray nozzles and various tools herein described.

In Fig. 15 is shown a structure adaptable to replace the bar 22d of Fig. 1 in the operation of the profiles or trimmers. When ware of such a diversified character is being made simultaneously on different heads of the same machine, that sufficient difference in cycle through the mechanism heretofore described and operating from bar 22d, cannot be obtained then a cam shaft and cam structure somewhat similar to Fig. 15 may be employed. A shaft 28m is rotatably mounted in an extension of girder 22 and is connected by a chain and sprockets to the shaft 9d to operate in synchronism therewith. The shaft is splined at 28n and provided with a series of spaced circumferential grooves at 28o. A U-shaped cam 28p is provided with an extension 28q and an adjustment screw 28r at one end and a detent spring 28s at the other. The detent spring 28s serves to retain the cam on the shaft and for quick application and removal. The peripheral grooves 28o are spaced similar to those on the tray and they locate the cams horizontally. The screw 28r determines the angular position of the cam and provides for adjustment of said position. Various designs of cams may be quickly applied and removed without interrupting the continuous operation of the machine, or a series of cams may be mounted adjacent each other and slid horizontally along the shaft to position the desired cam in functioning position.

I claim:

1. In apparatus for jiggering potteryware on a porous mold, a profile tool of blade shape and formed with a conduit having an open edge alongside the profile cutting edge and a cross sectional area increasing towards the side of the tool directed towards the edge of the mold, said conduit having a bevel portion at the end which co-operates with the center of the ware.

2. Apparatus for jiggering potteryware on a porous mold comprising: a profile tool arranged to profile the central portion of a piece of ware on the mold, and a second profile tool arranged to profile the outer part of the ware, both profile tools having therein an excess clay discharging conduit and being arranged with the conduit of the central tool discharging into the conduit of the outer tool.

3. In apparatus for the manufacture of pottery ware, a mold, a support for said mold, a profile tool, and means for mounting the tool for oblique or non-radial presentation to the outer periphery of the mold.

4. In apparatus for the manufacture of pottery ware, a mold, a support therefor, a plurality of jiggering tools for co-operation with the mold in the shaping of ware thereon, means for mounting said tools, at least one of said tools being mounted for oblique or non-radial presentation to the mold.

5. The process of making pottery ware which comprises jiggering a clay charge on a porous mold while applying an excess of water to the charge, then selectively applying a blast of air to the jiggered surface in such a manner as to distribute the resultant slurry uniformly over the surface of the ware.

6. In the manufacture of jiggered dinnerware, a method of manipulating a mold incident to the jiggering of the clay applied thereto which comprises, elevating the mold rapidly whilst rotating the same until the clay engages a profiling instrumentality and thereafter slowly approaching maximum elevation accompanied by rotation of the work and removal of excess material, slowly retracting the work after a predetermined dwell period at maximum elevation and progressively reducing the tool pressure on the work and thereafter rapidly lowering the mold.

7. A jigger tool including a block, a blade upon one side surface of the block and there being an outwardly flared groove in the underside of the block contiguous to the blade and leading from a point spaced from the inner edge of the block through the outer edge of the block.

8. A jigger tool including a block, a blade upon one side surface of the block and there being a groove in the underside of the block adjacent to the blade and leading from a point near the inner edge of the block through the outer edge of the block, said groove being flared toward the outer edge of the block.

9. A jigger tool including a block and an outwardly curved blade upon one side surface of the block.

10. A jigger tool including a block, an outwardly curved blade upon one side surface of the block, and there being a groove in the underside of the block adjacent to the blade and leading from a point near the inner edge of the block through the outer edge of the block.

11. A jigger tool including a block, an outwardly curved blade upon one side surface of the block, and there being a curved groove in the underside of the block adjacent to the blade and leading from a point near the inner edge of the block through the outer edge of the block.

12. A jigger tool including a block, an outwardly curved blade upon one side surface of the block, and there being a flared groove in the underside of the block adjacent to the blade and leading from a point near the inner edge of the block through the outer edge of the block.

13. A jigger tool including a block, an outwardly curved blade upon one side surface of the block, and there being a curved, flared groove in the underside of the block adjacent to the blade and leading from a point near the inner edge of the block through the outer edge of the block.

14. A jigger tool including a block, a blade upon one side surface of the block and there being a groove in the underside of the block leading from the zone of the inner edge of the block through the outer edge of the block through which excess material is discharged.

WILLIAM J. MILLER.